United States Patent [19]

Staats

[11] 4,078,436
[45] Mar. 14, 1978

[54] ADAPTIVE BIAS FOR ELECTRICALLY SUSPENDED GYROSCOPE

[75] Inventor: Robert C. Staats, Largo, Fla.

[73] Assignee: Honeywell Inc., Minneapolis, Minn.

[21] Appl. No.: 662,075

[22] Filed: Feb. 27, 1976

[51] Int. Cl.² .......................................... G01C 19/30
[52] U.S. Cl. ........................................ 74/5.4; 308/10
[58] Field of Search ............... 74/5.42, 5.41, 5.6, 74/5.4, 5.7; 308/10

[56] References Cited

U.S. PATENT DOCUMENTS

| 3,456,511 | 7/1969 | Clark et al. | 74/5.4 |
| 3,469,475 | 9/1969 | Staats | 74/5.4 |
| 3,489,018 | 1/1970 | Slivka | 74/5.42 |
| 3,787,100 | 1/1974 | Habermann et al. | 308/10 |
| 3,954,024 | 5/1976 | Staat | 308/10 |

Primary Examiner—Samuel Scott
Assistant Examiner—Wesley S. Ratliff, Jr.
Attorney, Agent, or Firm—Albin Medved

[57] ABSTRACT

Means for varying the preload bias forces in the suspension system of an electrostatic gyroscope as a function of acceleration forces to which the gyroscope is subjected. Under zero acceleration environment, the preload bias forces are maintained at a low level to keep at a minimum the errors due to gyro drift introduced by bias forces. With an increase in acceleration, bias forces are automatically increased, thereby providing the gyroscope with high "g" capability without sacrificing low "g" performance.

6 Claims, 4 Drawing Figures

FIG. 1
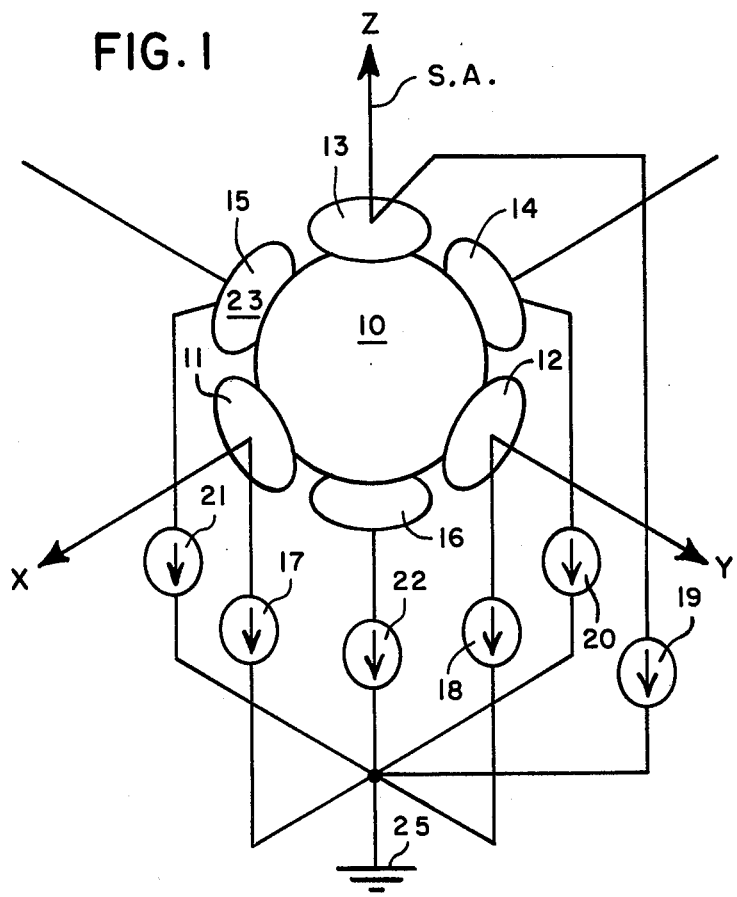
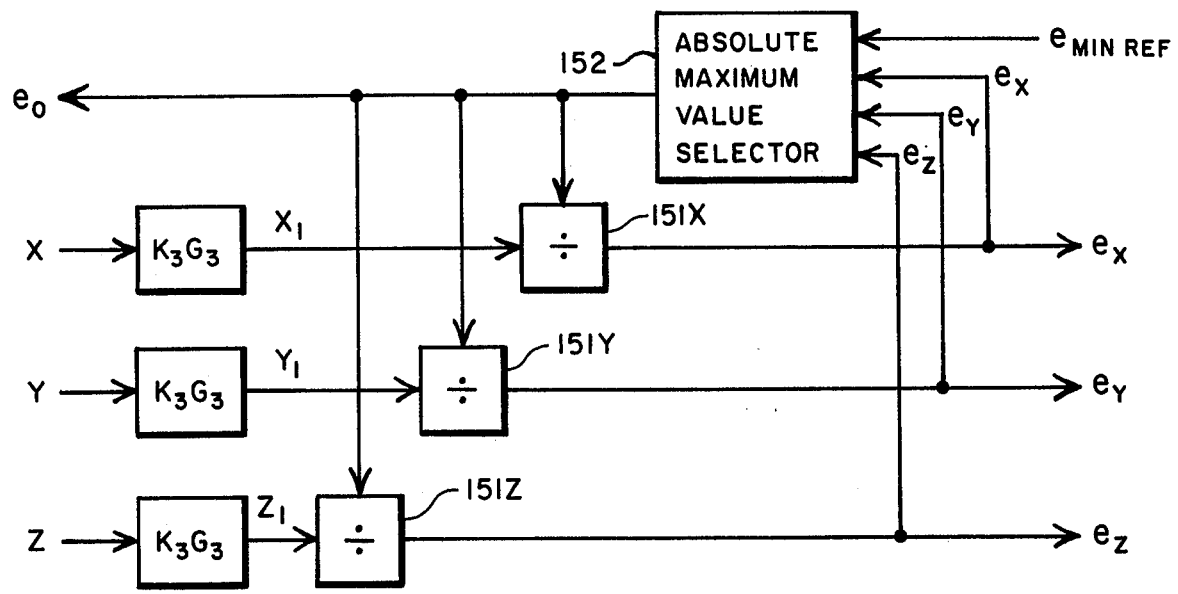
FIG. 3

ADAPTIVE BIAS FOR ELECTRICALLY SUSPENDED GYROSCOPE

BACKGROUND OF THE INVENTION

Field of the Invention

The method of supporting an inertial member of a gyroscope by means of electric fields is well known in the art. Various systems have been devised, exploiting the inherent advantages offered by electric field suspension. One such system is described in U.S. Pat. No. 3,469,457, wherein the inertial member is shown supported by electric fields between three pairs of electrodes. Each pair of electrodes is energized by an electronic channel, supplying the electrodes with electric charge. In the quiescent state, when no external forces are being applied to the inertial member, the electric charges on the various electrodes are substantially equal. The magnitude of these charges in the absence of external forces is commonly referred to as the preload bias.

As an external force is applied to the inertial member, the charges on the electrodes are automatically altered so as to oppose the displacement of the inertial member from the center of the electrode cavity. This means that the charge on one electrode along the axis of the force must increase, in relation to the charge on the electrode at the opposite side of the inertial member. In the prior art systems, the maximum charge obtainable on any one electrode is equal to twice the preload bias charge. The maximum rebalance force is achieved, therefore, when the charge on one of the electrodes is twice the preload bias charge, while the charge on the other electrode is reduced to zero. Under such an arrangement, an inertial instrument with high acceleration response capability is required to maintain a correspondingly high preload bias. The preload bias forces between electrodes and the inertial member must at all times be high enough to assure the support of the inertial member under maximum anticipated shock and vibration loading.

The overall gain of prior art linear suspension system is proportional to the preload bias force. This interdependence of preload bias force and suspension gain is characteristic of the prior art suspension systems. It is clear, however, that under normal operating environment, the acceleration to which the inertial instrument is subjected is relatively low and that the inertial member is subjected to relatively large acceleration forces only on certain occasions and for brief intervals. Thus, the preload bias could be substantially reduced when operating under normal environment if means are provided to automatically increase the bias when the inertial instrument is subjected to external forces. Lower preload bias will result in reduction of errors due to drift, which is introduced by high bias forces because of imperfections in the sphericity and mass balance of the inertial member.

SUMMARY OF THE INVENTION

The suspension system of the type disclosed herein consists of three pairs of constant charge amplifiers with each pair connected between one of three pairs of suspension electrodes. The six electrodes are arranged to form a spherical cavity within which a spherical inertial member is maintained in suspension by the electric fields generated between the inertial member and the electrodes. With proper design, the electric forces between the electrodes and the inertial member are independent of the gap between the electrodes and the member. Such a system, for example, is disclosed in U.S. Pat. No. 3,469,457. Each pair of charge amplifiers associated with each pair of electrodes has both a differential and common mode input. Preload or bias signals, obtained from a balanced, three-phase source, are applied to the common mode inputs. Rebalance or control signals derived from three position sensing bridges, one for each suspension axis, are applied to the corresponding differential inputs. The rebalance charge is therefore added to the preload charge in one amplifier of a pair and subtracted from the preload charge in the other amplifier. The net force on the inertial member along an axis is proportional to the difference in the squares of the magnitude of the charges between the two opposite electrodes and the inertial member. If the preload signal is maintained constant, the relationship between the force on the inertial member and the rebalance signal is linear.

The suspension according to the present invention has a fixed reference preload bias level for all forces below a predetermined acceleration environment and adapts it to optimum bias for all accelerations above this level. A lower limit of preload bias level is required to minimize noise problems and insure dynamic stability of the suspension servo in a zero g acceleration environment.

It is therefore an object of the present invention to provide an improved electrically supported inertial instrument. A more specific object of the present invention is to provide an improved suspension system for an electrostatic gyroscope wherein the bias level of the suspension forces is varied in accordance with the acceleration forces acting on the inertial member.

PREFERRED DESCRIPTION OF THE DRAWINGS

FIG. 1 is a schematic representation of the electric field suspension system for inertial instruments wherein the present invention will find application;

FIG. 3 illustrates the mechanization of the present invention for use with a three-channel suspension.

Figure 2:
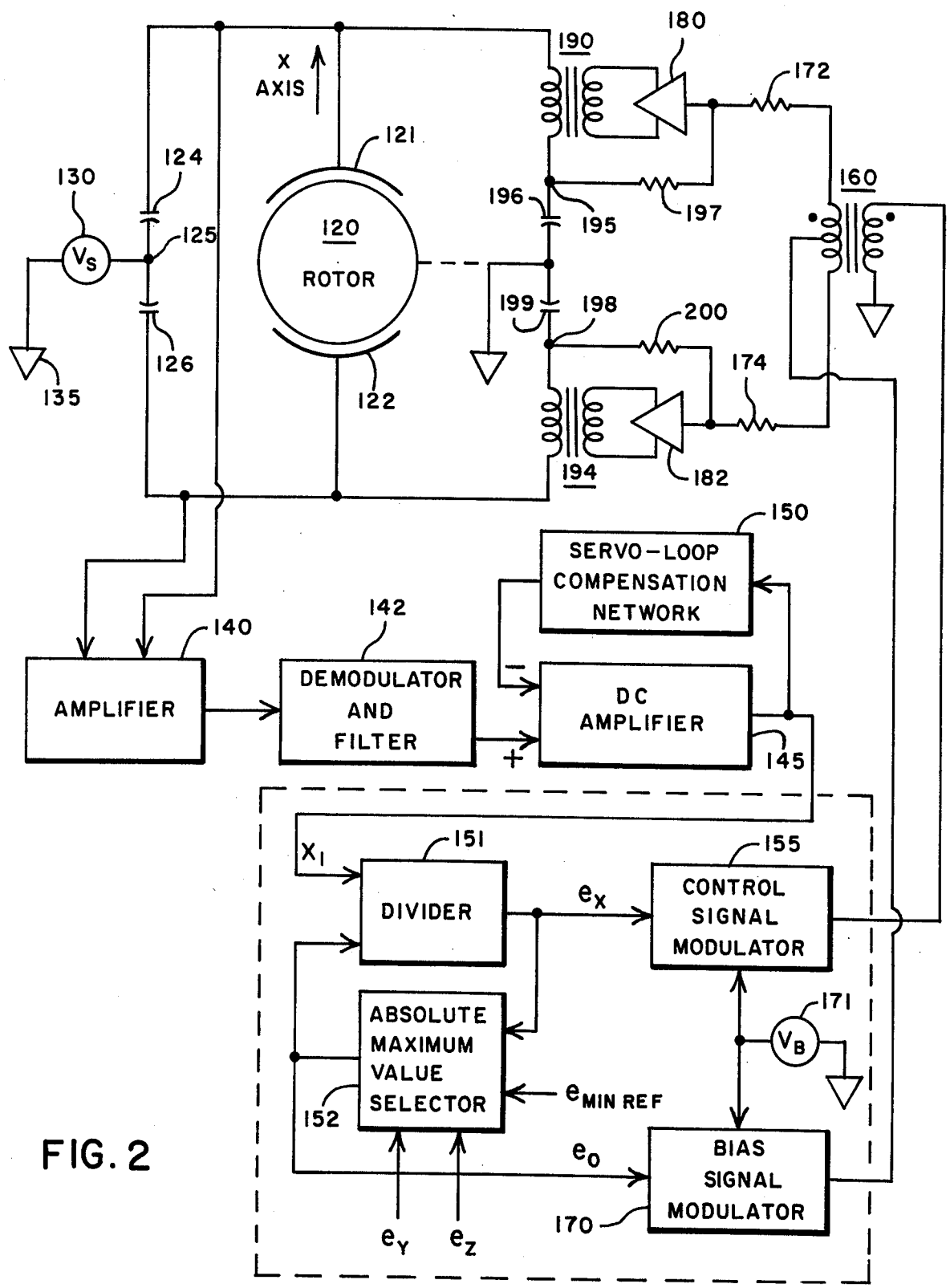
FIG. 2 is a schematic circuit diagram of a typical suspension servo channel with adaptive preload bias control according to the present invention.

Referring now to FIG. 1, a spherical inertial member 10 is supported by six electrically isolated electrodes 11 through 16, outlining a spherical cavity 23 with a radius somewhat larger than the radius of inertial member 10. Charge generators 17 through 22 are connected between a ground terminal 25 and electrodes 11 through 16, respectively.

Electrodes 11 and 14, 12 and 15, 13 and 16, form electrode pairs with the two electrodes of each pair positioned at diametrically opposite sides of cavity 23, such that an axis joining the geometric centers of the two electrodes of each pair passes substantially through the center of the cavity. The three axes (X, Y, and Z) of the three electrode pairs are substantially orthogonal to each other and intersect each other at the center of electrode cavity 23. The X axis is associated with electrodes 11 and 14, the Y axis is associated with electrodes 12 and 15, and the Z axis is associated with electrodes 13 and 16. Electric field created between each electrode and inertial member 10 by the respective charge generators is controlled in such a way that inertial member 10 is continually forced towards the center of electrode cavity 23. An example of the electric suspension system of the type wherein the present invention will be particularly useful can be found in U.S. Pat. No. 3,469,457, issued on Sept. 30, 1969.

In FIG. 2, a spherical inertial member 120 is shown supported along one axis between a pair of electrodes 121 and 122. Electrodes 121 and 122 are energized by amplifiers 180 and 182, respectively. The output of amplifier 180 is applied to the primary winding of a transformer 190, whose secondary winding is connected between electrode 121 and a junction point 195. A capacitor 196 is connected between junction point 195 and a ground potential terminal 135, and a resistor 197 is connected between junction point 195 and the input of amplifier 180. The output of amplifier 182 is applied to the primary winding of transformer 194, whose secondary winding is connected between electrode 122 and a junction point 198. Junction point 198 is connected to ground potential terminal 135 through a capacitor 199 and to the input of amplifier 182 through a resistor 200. The inputs of amplifiers 180 and 182 are connected to the opposite ends of a center tapped secondary winding of a transformer 160 through resistors 172 and 174, respectively. The center tap of the secondary winding of transformer 160 is connected to receive a bias signal from the output of a bias signal modulator 170. The bias signal is split into two equal parts by the center tapped winding such that, absent a signal on the primary winding of transformer 160, equal signals are applied to the inputs of amplifiers 180 and 182. A voltage source 171 provides an alternating signal to bias signal modulator 170 and to a control signal modulator 155.

The primary winding of transformer 160 is connected to receive a control signal from the output of control signal modulator 155. The control signal appearing across the primary winding of transformer 160 adds to the bias signal in one-half of the center tapped secondary winding, while it subtracts from the bias signal in the other half of the secondary winding. The amplitude of the control signal is a function of the displacement of inertial member 120 from the preferred center position between electrodes 121 and 122. The phase of the control signal relative to the bias signal, is either 0° or 180° dependent upon the direction of displacement of inertial member 120 along the axis of electrode pair 121-122.

The displacement of inertial member 120 from the predetermined central position is detected by means of a capacitance bridge comprised of capacitors 124 and 126 and the electrode to inertial member capacitance at electrodes 121 and 122. Capacitor 124 is connected between electrode 121 and a junction point 125, while capacitor 126 is connected between junction point 125 and electrode 122. An alternating voltage source 130, of different frequency from source 171, which provides an alternating voltage signal to control signal modulator 155 and bias signal modulator 170, is provided and connected between junction point 125 and ground potential terminal 135. The error signal, indicative of inertial member displacement, is taken from the capacitance bridge between electrodes 121 and 122 and is applied to the input of an amplifier 140. The output of amplifier 140 is applied to the input of a demodulator and filter 142, wherein the signal is demodulated to produce a DC signal indicative of the capacitance bridge unbalance.

The DC signal from demodulator and filter 142 is applied to the input of a DC amplifier 145. A servo-loop compensation network 150 is connected between the output and input of DC amplifier 145 to establish the gain and to provide appropriate compensation for the servo-loop.

In prior art suspension systems, the output of DC amplifier 145 would normally be applied, through a modulator, directly to the primary winding of transformer 160, and the bias signal applied at the center tap at the secondary winding of transformer 160 would be maintained constant irrespective of the magnitude of external forces acting on inertial member 120. The maximum rebalance force in such prior art systems is achieved when the charge on one electrode is twice the preload charge, while the charge on the other electrode of the pair is reduced to zero. High preload bias is desirable, on one hand, to give the gyroscope a high "g" capability, i.e., an ability to handle high acceleration forces. On the other hand, lower preload bias is desirable to reduce errors due to drift, which are introduced by high bias forces because of imperfections in the sphericity and mass balance of the inertial member. The present invention accomplishes both ends by varying the preload bias signal in accordance with the instantaneous requirements of the suspension system.

In accordance with the present invention the bias signal is varied as a function of the control signal such that, above a predetermined threshold, the superimposition of the control signal on the bias signal always results in a near zero input signal at one of the charge amplifiers and a signal equal to twice the amplitude of the control signal at the input of the other charge amplifier.

To aid in understanding of the adaptive preload bias according to the present invention, consider a single suspension channel, as shown in FIG. 2. The net electric force ($F_x$) along the axis of electrodes 121 and 122, identified as the X axis, can be expressed as:

$$F_x = K_1 Q_o Q_x \quad (1)$$

where $K_1$ is a constant of proportionality, $Q_o$ and $Q_x$ are the preload and rebalance charges, respectively.

Forming the force balance equation for that axis, and dividing by the mass of the inertial member (M) gives:

$$a_i = \ddot{x} + \frac{K_1 Q_o Q_x}{M} \quad (2)$$

where $a_i$ is the input acceleration.

In a conventional prior art fixed bias suspension, the rebalance charge $Q_x$ is made linearly proportional to the displacement of the inertial member as:

$$Q_x = K_2 G_2 x \quad (3)$$

where $x$ is the displacement, $K_2$ is a gain constant, and $G_2$ is the dynamic portion of $K_2$ (i.e., lead, lag, etc.). Substitution of Equation 3 into Equation 2 and taking the LaPlace Transform (for quiescent initial conditions) gives:

$$\frac{x}{a_i} = \frac{1}{S^2 + \frac{K_1 K_2 G_2 Q_o}{M}} \quad (4)$$

It can be seen from Equation 4 that the system is linear and can be stabilized by appropriate choice of the gain and dynamic terms. It is also evident that $Q_o$ affects the loop gain and, therefore, if this term is variable, the loop dynamics will vary with acceleration. This is undesirable since both displacement of the inertial member and dynamic response must be rigidly controlled to minimize electric torque and the run-down rate of the inertial member, as well as to insure loop stability under all conditions of input acceleration.

Suppose instead of linear loop compensation, a nonlinear compensation is used, such as:

$$Q_x = \frac{K_3 G_3}{Q_o} x \quad (5)$$

The relationship between rotor displacement and input acceleration becomes:

$$\frac{x}{a_i} = \frac{1}{S^2 + \frac{K_1 K_3 G_3}{M}} \quad (6)$$

It is evident from Equation 6 that the desired loop compensation can be achieved; that is, the loop gain and suspension dynamics are independent of bias charge.

In addition to loop gain and dynamics, there is another constraint on preload charge $Q_o$. The foregoing discussion was limited to one channel of suspension along the X axis. In a three axis suspension, three such channels operate in a three phase relationship. When the entire three suspension axes are considered, together with the three phase relationship, $Q_o$ must be the same magnitude for all three axes. The preload bias charge will be optimally minimum if, along the axis sustaining the greatest acceleration, only the electrode pulling against the acceleration force is excited. This condition will result if the preload and rebalance charges are equal in this axis and the preload charges in the other two axes are thus made equal to the preload charge of this axis.

Referring again to FIG. 2, the DC output signal of amplifier 145 is applied to one input of a divider 151. Divider 151 has a second input connected to receive a signal from an absolute maximum value selector 152 disclosed in more detail in FIG. 4. At the output of divider 151 will appear a signal which is a function of the inertial member position error signal ($x_1$) divided by the bias signal ($e_o$). The output of divider 151 is then a DC signal ($e_x$) which is applied to the input of a control signal modulator 155, the output of which is connected to energize the primary winding of transformer 160. It will be noted that through the action of divider 151, the product $e_o e_x$ is proportional to the position error signal $x_1$, as required by Equation 5. $e_o$ and $e_x$, of course, are directly proportional to $Q_o$ and $Q_x$, respectively. Signal $e_o$ from the output of absolute maximum value selector 152 is applied to the input of bias signal modulator 170, whose output is connected to the center tap of the secondary winding of transformer 160 and establishes the preload bias. An alternating voltage source 171 is connected to the second inputs of control signal modulator 155 and bias signal modulator 170, respectively. The outputs of these modulators are then AC signals whose amplitudes are modulated in accordance with signals $e_x$ and $e_o$, respectively. Absolute maximum value selector 152 is shown having inputs $e_x$, $e_y$, $e_z$, and $e_{min\,ref}$ and an output $e_o$. $e_o$, $e_x$, $e_y$, and $e_z$ are the preload and rebalance signals which control the charge amplifier outputs $Q_o$, $Q_x$, $Q_y$, and $Q_z$, respectively.

The function of absolute maximum value selector 152 is to select the highest rebalance signal appearing at its several inputs. The reason for this is, as mentioned previously, that when all three suspension axes of a system such as shown in FIG. 1 are considered, it is desirable that $e_o$ be the same for all three axes. The optimum operation of the system will occur when the preload bias is the minimum necessary to accommodate the channel energizing the electrodes along the axis sustaining the greatest acceleration. This means that along the axis of greatest acceleration, only the electrode pulling against the acceleration force is energized, while the other electrode of the pair is essentially at zero potential. To achieve this condition, the preload bias and rebalance charge must be equal in suspension channel for this axis. For example, if this happens to be the X axis, it follows that $e_o$ and $e_x$ are equal and that $e_o$ in the suspension channels for the Y and Z axes is also equal to $e_x$. If, on the other hand, the greatest acceleration force at the moment is along the Y axis, $e_o$ in all the axes will be equal to $e_y$, etc.

The mechanization of the adaptive preload bias apparatus of the present invention for use with a three channel, three phase system may be more readily understood by referring to FIG. 3. It is shown there that the output of absolute maximum value selector 152 is applied to an input of each of three dividers 151x, 151y, and 151z. Only one absolute maximum value selector is required, while a separate divider is needed for each suspension channel. Each of the dividers has a second input at which it receives the inertial member position error signal along the respective axis of the channel. The blocks identified as $K_3 G_3$ represent the transfer function of each suspension channel. Signals $e_x$, $e_y$, and $e_z$ appearing at the outputs of the dividers are applied to the control signal modulators associated with the respective channels. $e_x$ is applied to control signal modulator 155 of the X-axis channel illustrated in FIG. 2. The $e_y$ signal is applied to the control signal modulator of the Y-axis suspension channel, and the $e_z$ signal is applied to the control signal modulator of the Z-axis suspension channel. A separate bias signal modulator is also required for each of the three channels in a three phase suspension system. Although the amplitude of the bias signal is the same for all three channels, the three bias signals must be in three phase relationship.

Figure 4:
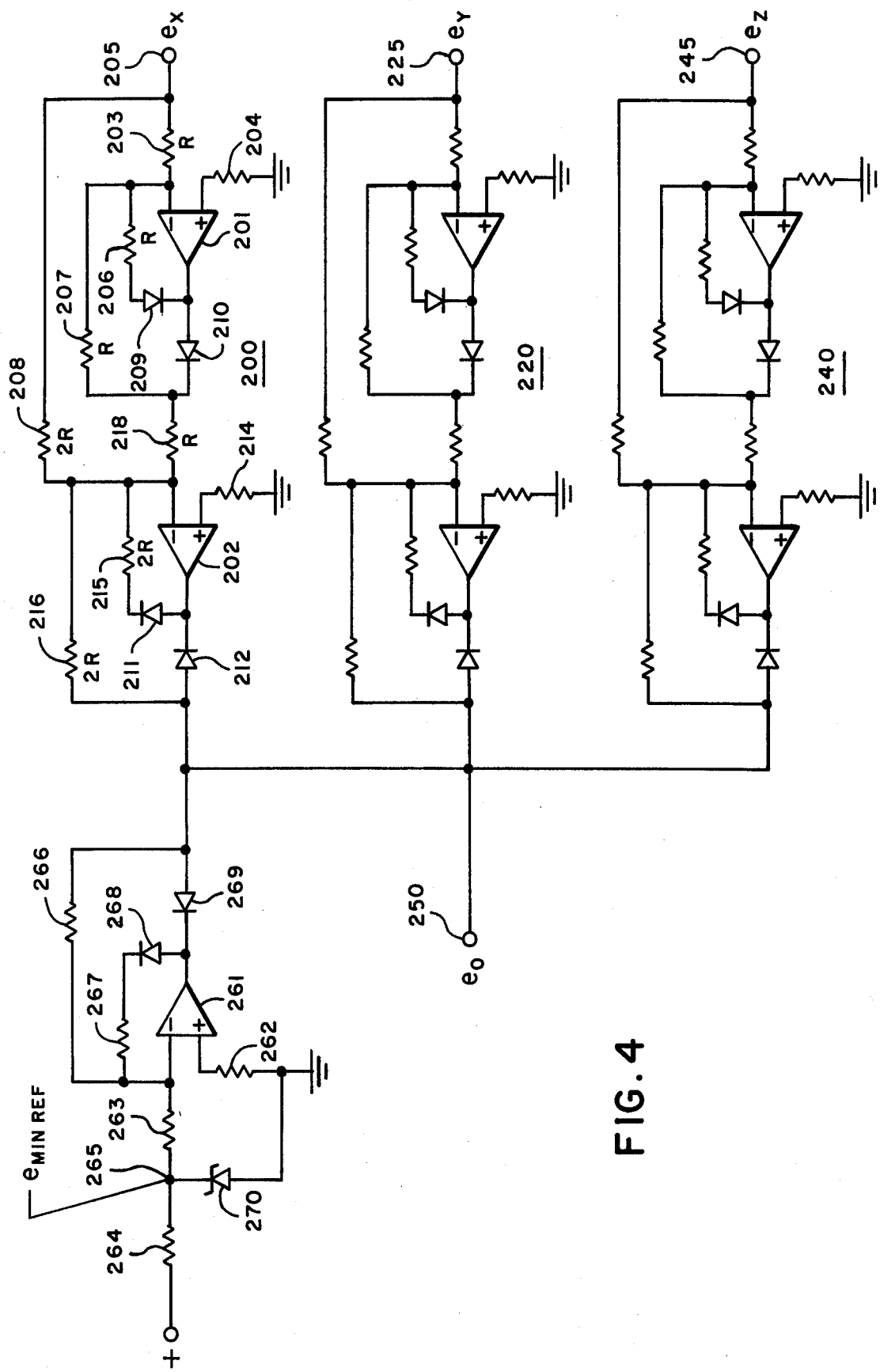
FIG. 4 is a schematic diagram of a circuit for an absolute maximum value selector for use in the apparatus of FIGS. 2 and 3.

The absolute maximum value selector 152, shown in FIGS. 2 and 3, is essentially an OR gate generating at its output a DC signal whose amplitude is equal to the absolute value of the largest signal appearing at its various inputs. A schematic diagram of an absolute maximum value selector used in the preferred embodiment is shown in FIG. 4. Input terminals 205, 225, and 245 are provided for receiving signals $e_x$, $e_y$, and $e_z$, respectively. A minimum reference signal $e_{min\,ref}$ is established at junction point 265 by a zener diode 170. The output signal $e_o$ appears at output terminal 250.

Input terminal 205 is connected to a negative input of an operational amplifier 201 through a resistor 203. The positive input terminal of amplifier 201 is connected to ground through a resistor 204. A resistor 206 is connected between the negative input of amplifier 201 and the anode of a diode 209, whose cathode is connected to the output of amplifier 201. A diode 210 has its anode connected to the output of amplifier 201 and its cathode connected to the negative input of an operational amplifier 202 through a resistor 218. The cathode of diode 210 is further connected back to the negative input of amplifier 201 through a resistor 207. A signal path is provided directly from input terminal 205 to the negative input of amplifier 202 through a resistor 208. A feedback path is provided from the output of amplifier 202 to its negative input through a series combination of a diode 211 having its anode connected to the output of amplifier 202 and a resistor 215 connected between the anode of diode 211 and the negative input of amplifier 202. A second feedback path is provided by a diode 212 having its cathode connected to the output of amplifier 202 and a resistor 216 connected between the anode of diode 212 and the negative input of amplifier 202. The anode of diode 212 is connected directly to output terminal 250.

Operational amplifiers 201 and 202, together with the associated resistors and diodes, form an absolute value detector circuit 200. Circuit 200 generates at its output a negative polarity DC signal whose amplitude is equal to the amplitude of the DC signal appearing at input 205, regardless of the polarity of such input signal. Identical absolute value detector circuits 220 and 240 are provided for processing signals $e_y$ and $e_z$. The relative value of resistors in absolute value detector circuit 200 are indicated such that the output signal will be a true indication of the input signal amplitude regardless of its polarity.

The minimum reference potential is established by zener diode 270 connected between ground terminal and a junction point 265. Junction point 265 is further connected to a source of positive potential through a resistor 264 and to the negative input of an operational amplifier 261 through a resistor 263. A diode 268 and resistor 267 are connected in a series path between the output of amplifier 261 and its negative input, diode 268 being oriented for forward current flow from the output of the amplifier to its input. A second diode 269 has its cathode connected to the output of amplifier 261 and has its anode connected to the negative input of amplifier 261 through a resistor 266 and also to output terminal 250. The positive input of operational amplifier 261 is connected to ground terminal through a resistor 262.

It will be clear to those skilled in the art that the circuitry of FIG. 4 is essentially a precision OR gate and that signal $e_o$ at output terminal 250 at any instant will be the largest negative signal generated by any of the three absolute value detector circuits or the minimum reference voltage generator.

The foregoing is a description of the preferred embodiment of the invention. Other embodiments will be obvious to those skilled in the art.

What is claimed is:

1. Apparatus for supplying electric charge to a pair of electrodes supporting the inertial member of an inertial instrument along an axis, said apparatus comprising:
    position sensing means for detecting displacement of said inertial member along said axis and for generating an error signal as a function of said displacement;
    means for generating a bias charge signal and supplying said bias charge signal to each of said electrodes;
    means for generating a control charge signal function of said error signal and adding said control charge signal to the bias charge signal at one of said electrodes while subtracting said charge signal from the bias charge signal at the other of said electrodes; and
    means for varying the bias charge as a function of said control charge such that the resulting charge on one of the electrodes is substantially equal to twice the bias charge, while the resulting charge on the other of said electrodes is substantially equal to zero.

2. Apparatus according to claim 1, wherein means is provided for maintaining said bias charge signal above a predetermined minimum and to prevent variation in said bias charge signal until the control charge signal exceeds said minimum.

3. In an inertial instrument wherein an inertial member is maintained in suspension along an axis, between first and second electrodes positioned at substantially opposite sides of said member, and wherein means are provided for generating electric charge at said electrodes to produce said electric forces, said means for generating electric charges comprising:
    first and second charge amplifiers connected to supply electric charge to said first and second electrodes, respectively, said first and second amplifiers having a common mode input and a differential mode input;
    means for sensing the displacement of the inertial member from a preferred position along said axis and for generating a position error signal;
    a bias signal generating means for supplying a bias signal to the common mode input of said first and second amplifiers;
    control signal generating means for providing a control signal as a function of said position error signal and to supply said control signal to the differential mode input of said first and second amplifiers; and
    means for varying the amplitude of said bias signal as a function of the position error signal such that upon displacement of said inertial member from the preferred position, the charge supplied by one of said charge amplifiers is substantially zero and the charge supplied by the other of said charge amplifiers is in the amount required to generate a force necessary to return the inertial member to its preferred position.

4. Apparatus according to claim 3, wherein means is provided for establishing a minimum level for said bias signal and for allowing variation in said bias signal only above said minimum level.

5. In an inertial instrument wherein a substantially spherical inertial member is maintained in suspension between a plurality of pairs of electrodes by means of electric forces, each said pair consisting of first and second electrodes positioned along an axis at diametrically opposite sides of said member and wherein means are provided for generating electric charges to produce said electric forces, said means for generating electric charges for each pair of electrodes comprising:
    first and second charge amplifiers connected to supply electric charge to said first and second electrodes, respectively, said first and second amplifiers having a common mode input and a differential mode input;
    means for sensing the displacement of the inertial member from a preferred position along the axis of said pair and for generating a position error signal;
    a bias signal generating means for supplying a bias signal to the common mode input of said first and second amplifiers;

control signal generating means for providing a control signal as a function of said position error signal and to supply said control signal to the differential mode input of said first and second amplifiers; and means for varying the amplitude of said bias signal as a function of the position error signal such that upon displacement of said inertial member from the preferred position, the charge supplied by one of said charge amplifiers is substantially zero and the charge supplied by the other of said charge amplifiers is in the amount required to generate a force necessary to return the inertial member to its preferred position.

6. Apparatus according to claim 5 wherein three pairs of electrodes are provided, each pair associated with one of three orthogonal axes intersecting substantially at the center of the inertial member; and wherein further the bias signals in each of the three means for generating electric charges for the three pairs of electrodes are equal in amplitude.

* * * * *